United States Patent [19]

Sharp

[11] 4,068,499
[45] Jan. 17, 1978

[54] TELESCOPING UNIVERSAL JOINTS

[76] Inventor: Everett H. Sharp, 344 E. Maryknoll, Rochester, Mich. 48063

[21] Appl. No.: 652,511

[22] Filed: Jan. 26, 1976

[51] Int. Cl.² ............................................. F16D 3/02
[52] U.S. Cl. ........................................... 64/8; 64/21; 64/7; 64/32 F
[58] Field of Search ...................... 64/21, 8, 7, 23, 32, 64/6

[56] References Cited
U.S. PATENT DOCUMENTS

| 2,057,875 | 10/1936 | Benham | 64/8 |
|---|---|---|---|
| 2,898,749 | 8/1959 | Parkman | 64/8 |
| 2,987,896 | 6/1961 | Griffith | 64/21 |
| 3,490,251 | 1/1970 | Rocthlisberger | 64/8 |
| 3,714,797 | 2/1973 | Fisher | 64/8 |
| 3,789,624 | 2/1974 | Camosso | 64/8 |

Primary Examiner—Samuel Scott
Assistant Examiner—Randall Heald
Attorney, Agent, or Firm—Barnes, Kisselle, Raisch & Choate

[57] ABSTRACT

A telescoping universal joint comprising a driving member, a driven member, torque transmitting means between the driving and driven member, and means for limiting the relative axial movement in both directons between the driving member and the driven member. The universal joint is described as being utilized together with a second universal joint in a transverse drive line of an automotive vehicle between a differential and a wheel or in a longitudinal drive line between a transmission and a differential.

68 Claims, 16 Drawing Figures

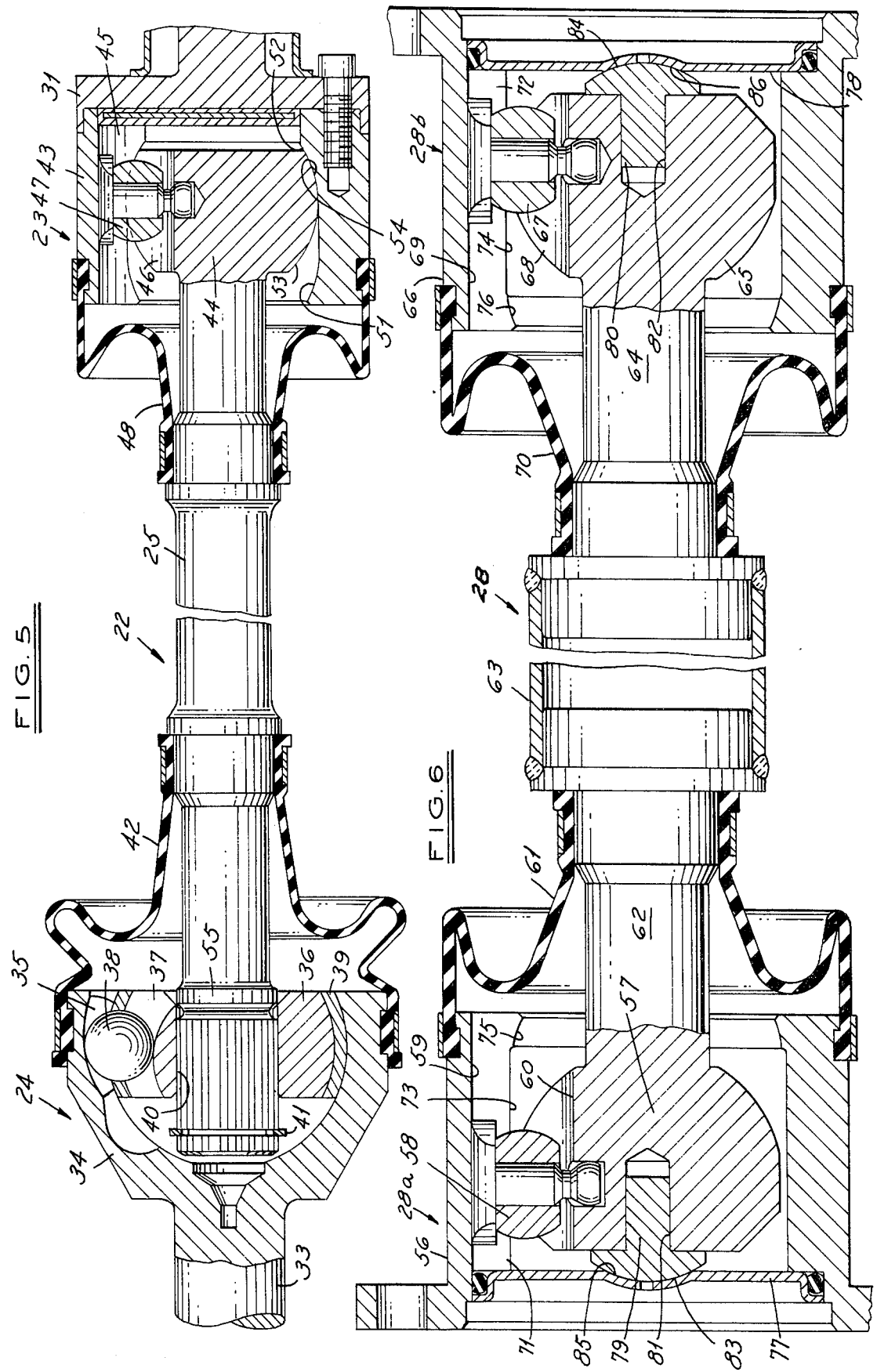

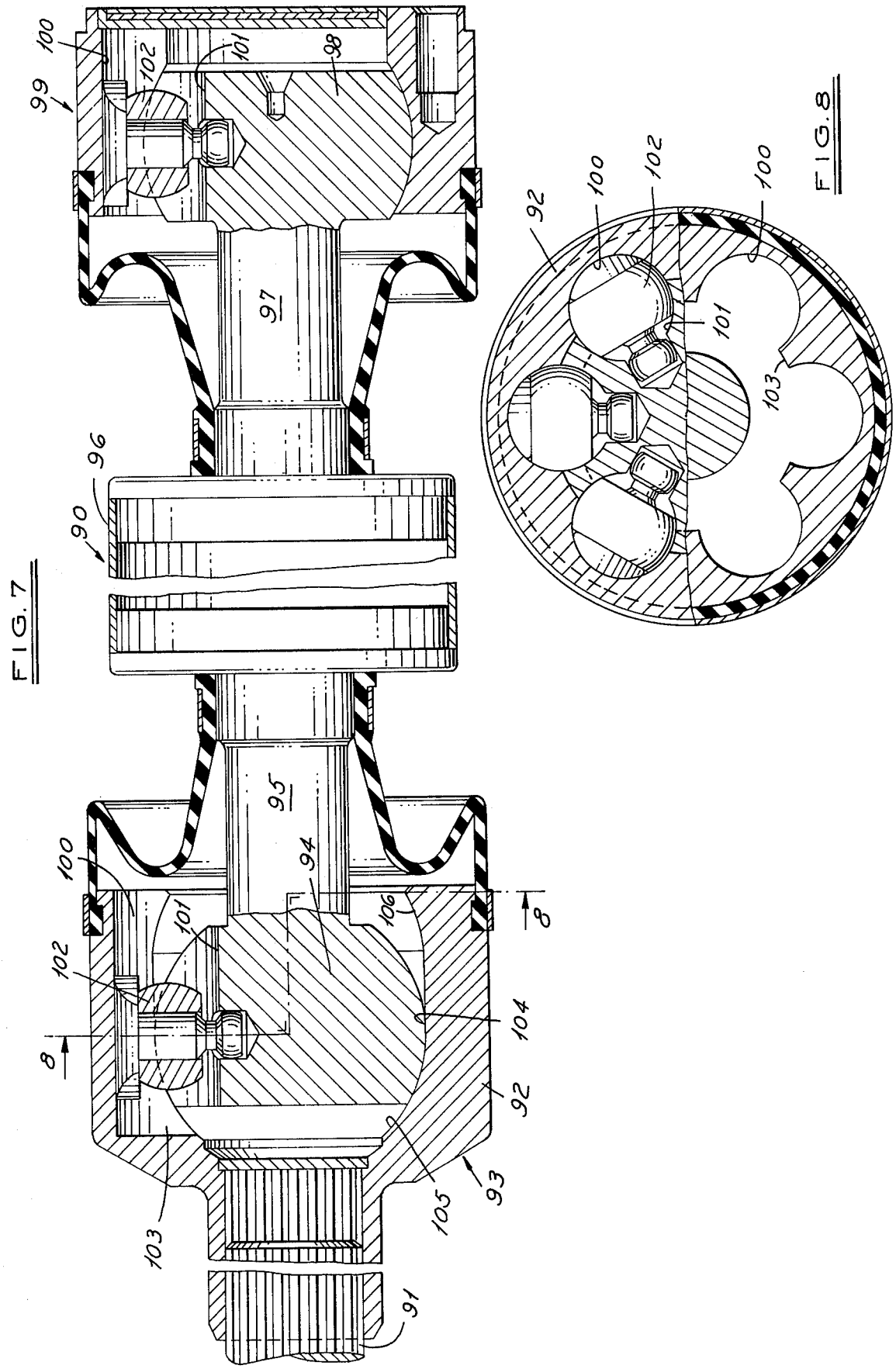

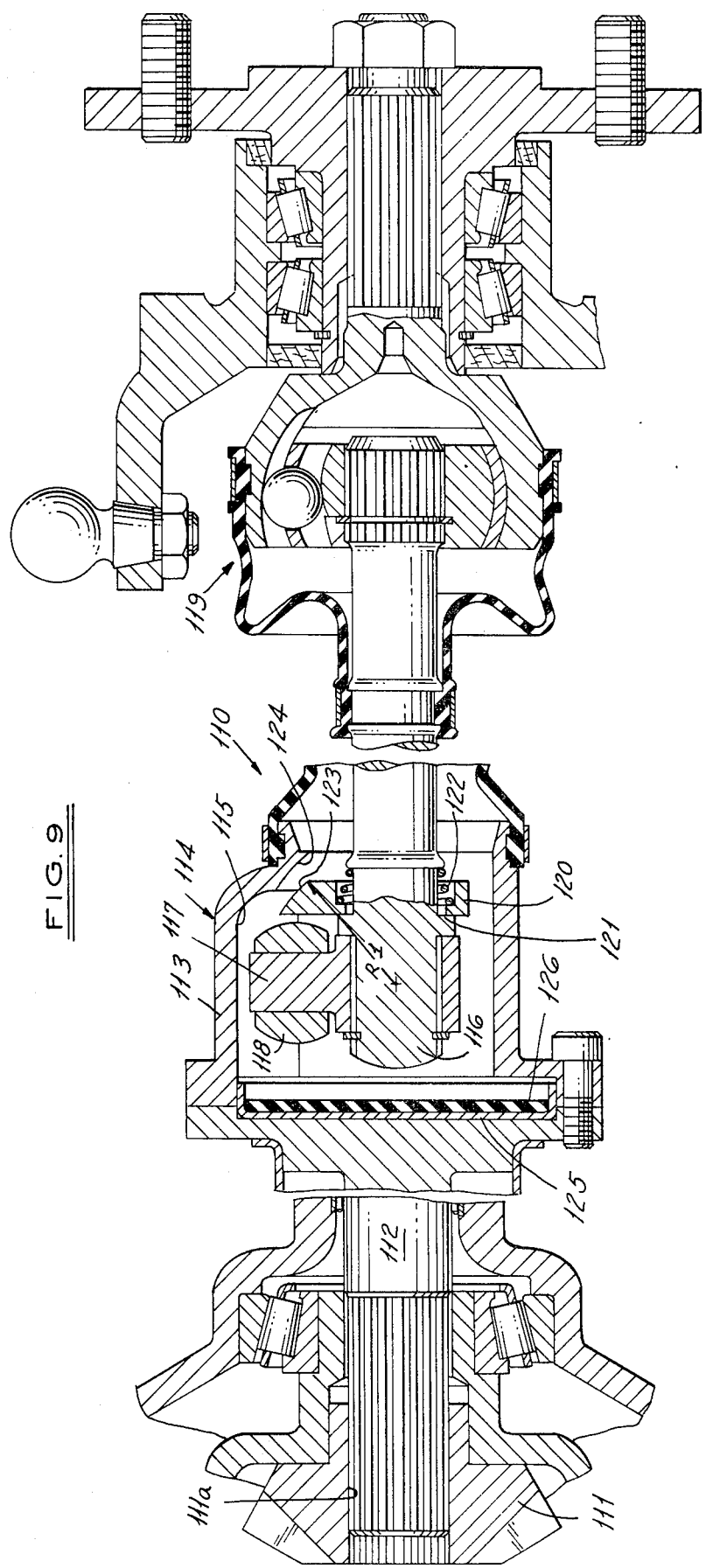

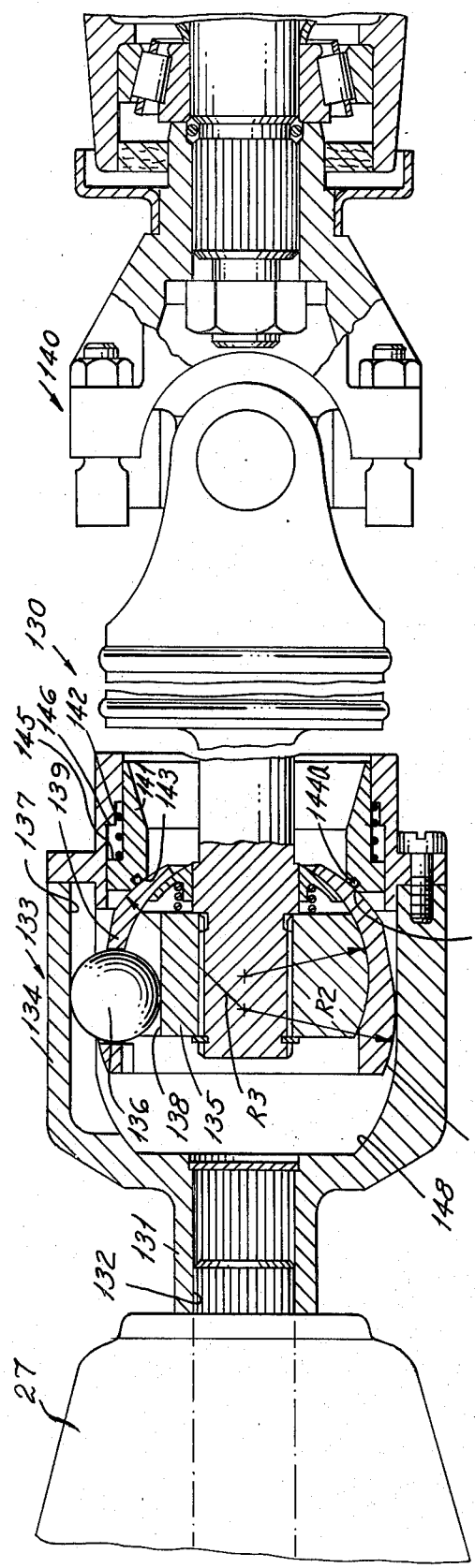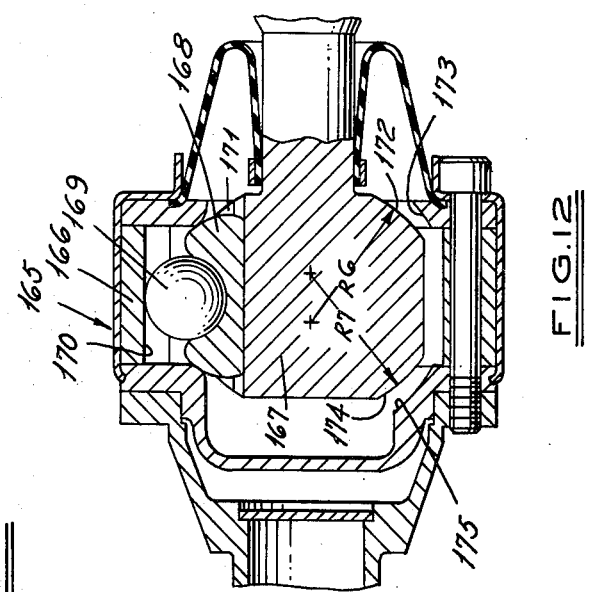

TELESCOPING UNIVERSAL JOINTS

This invention relates to universal joints in general.

BACKGROUND OF THE INVENTION

As is well known, universally jointed drive lines are often used to transmit a torque from a power source to a load which is movable with respect to the power source. Since they are able to pivot or flex, while transmitting torque, universal joints are able to accommodate a variety of movements. However, in many cases, relative movements between the source and load require length changes as well as pivotal or angular movements in the drive line. These length changes have long been accommodated by sliding splined connections and the like at some point in the drive line. More recently, universal joints have been designed which permit relative axial movement between their driving and driven members, thus, in some cases, avoiding the need for sliding splined connections.

It is well known that a disadvantage of sliding or telescoping splined connections in drive lines is their high frictional resistance to telescoping under load. This can add greatly to the stresses on bearings and other members supporting the drive line. Another disadvantage of such splined connections is their "stick-slip" characteristic, due to differences between static and dynamic sliding friction, which often causes the splines to telescope in an abrupt or jerky manner and which makes them undesirable for many applications which require smoothness and quietness. Replacement of telescoping splines, where practical, with telescoping universal joints, i.e. joints allowing axial movement between their driving and driven members, greatly reduces these sliding spline problems. This is because telescoping universal joints are usually better lubricated internally than sliding splines, have their torque transmitting surfaces farther from the axis of rotation, are less likely to have static conditions and static friction between torque transmitting surfaces and, in many cases, substitute rolling or quasi-rolling action for sliding action at the torque transmitting surfaces.

Because of this functional superiority and because of simplification sometimes possible by eliminating sliding splines, telescoping universal joints have become common in certain applications. However, their use is limited to applications requiring a relatively small length change since their stroke is severely limited by the need to compromise pivotal angular capacity to achieve long strokes and by the difficulty in sealing a universal joint which combines a long stroke with its pivotal movement. Further, the usable stroke of such a joint is even less than that theoretically possible because the joint may come apart at the end of the theoretically possible stroke or because a functional part of the joint may strike some other member, causing noise, vibration and possible damage to the unit. Thus, a "margin of safety" is usually allowed at each end of the theoretical stroke to allow for these practical conditions.

An object of this invention is to provide a telescoping universal joint having stroke limiting means which are able to sustain substantial axial forces and impacts during normal joint operation and the engagement of which does not cause undesirable noise or vibration of the universal joint.

Telescoping universal joints incorporating such stroke limiting means have many more potential applications than present joints because: The full theoretical stroke of the joint can be used; multiple joints can be used in series to accommodate greater length changes; and telescoping joints can be used in conjunction with telescoping splines and similar structures to produce novel interaction in the drive line. This latter combination is particularly suitable for a class of applications which requires only a relatively small length change in the drive line during normal operation but which requires an additional provision for length changes to accommodate tolerances in the building of the machine, to permit assembly or disassembly of parts of the machine, or to accommodate occasional greater than normal length changes and the like. In these applications, a telescoping universal joint can accommodate normal length changes with low frictional resistance and little "stick-slip" tendency, while for greater length changes, the stroke limiting means of the joint prevents damage or disassembly of the universal joint and permits the excess stroke to be taken by sliding splines or other such mechanism in association with the universal joint. In many instances, a drive line will necessarily have splines or the like for other reasons and such splines can also be used to accommodate excess stroke.

Thus, telescoping universal joints and telescoping splines can be combined in a novel manner with little or no penalty, provided only that the universal joint incorporates stroke limiting means sufficiently strong and servicable to transmit the relatively large axial forces needed to cause splines or the like to slide when required. Automobile and truck drive shafts often fall into this class of applications.

Another object of this invention is to provide an alternative mechanical sealing means for telescoping universal joints for use in place of the flexible boot-type seals presently used.

Further objects of this invention will become apparent from the following detailed description taken in conjunction with the accompanying drawings.

DESCRIPTION OF THE DRAWINGS

FIG. 5 is a longitudinal part sectional view of a drive shaft assembly embodying the invention.

FIG. 6 is a longitudinal part sectional fragmentary view of a modified form of drive shaft assembly.

FIG. 7 is a longitudinal sectional view of a modified form of drive shaft assembly.

FIG. 8 is a fragmentary sectional view taken along the line 8—8 in FIG. 7.

FIG. 9 is a fragmentary sectional view of a modified drive shaft assembly.

FIG. 10 is a longitudinal sectional view of another modified form of drive shaft assembly.

FIG. 11 is a longitudinal sectional view of a modified telescoping universal joint.

FIG. 12 is a longitudinal sectional view through a modified telescoping universal joint.

DESCRIPTION

Figure 1:
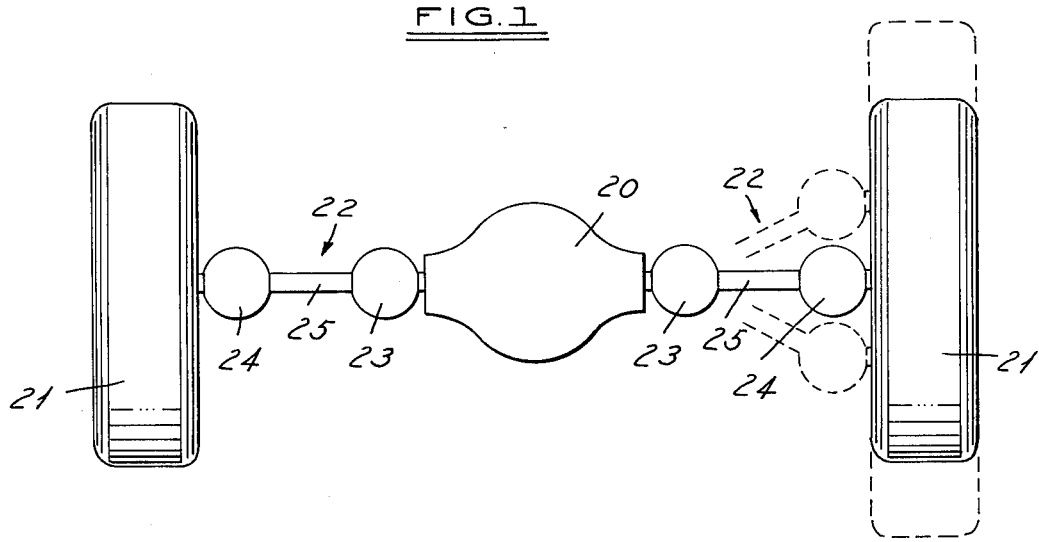
FIG. 1 is a schematic rear elevational view of the final drive train for the independently sprung driving wheels of an automobile.
Figure 2:
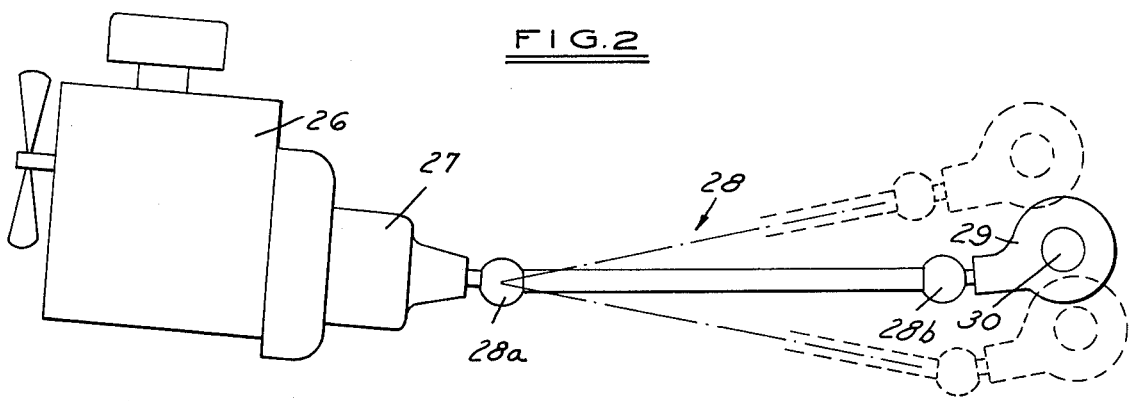
FIG. 2 is a schematic side elevational view of the drive train of a conventional automobile with front engine and spring mounted rear driving axle.

FIGS. 1 and 2 indicate schematically two common applications which require changes of both length and angle in a universally jointed drive line.

FIG. 1 shows a portion of an automobile including a differential 20 that drives wheels 21 through drive shaft assemblies 22 that include universal joints 23, 24 and a shaft 25. FIG. 2 shows an automobile drive train including an engine 26, a transmission 27, a drive shaft assembly 28 including two universal joints 28a, 28b, a differential 29, and an axle 30.

Referring to FIG. 5, a drive shaft assembly 22 which can be utilized in the drive arrangement shown in FIG. 1 comprises a flanged output member 31 from differential 20 driving universal joint 23, a connecting shaft 25 by which universal joint 23 drives universal joint 24 and an output member 33, a part of universal joint 24, which drives wheel 21, not shown.

As shown, the universal joint 24 is of conventional construction such as the well known bell type Rzeppa joint comprising an outer race 34 having grooves 35 and an inner race 36 having grooves 37 for receiving torque transmitting balls 38 and a ball cage 39 positioning balls 38 with respect to grooves 35, 37. Shaft 25 is connected to the inner race 36 by a spline connection 40. A snap ring 41 in a groove in shaft 25 provides a stop to limit outward axial movement of shaft 25 relative to inner race 36. A boot 42 provides a seal to retain the lubricant within the universal joint.

The universal joint 23 is of the general type shown in my U.S. Pat. No. Re. 26,691 and comprises an outer race 43, and an inner race 44 which have complementary grooves 45, 46 receiving torque transmitting means 47. A boot 48 provides a seal to retain lubricant.

Figure 4:
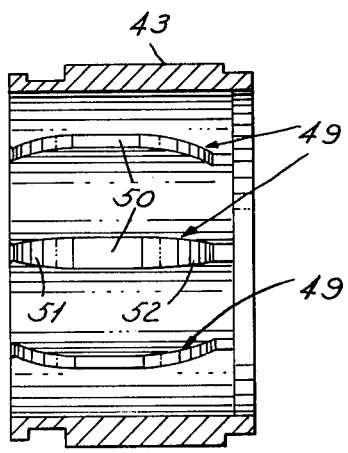
FIG. 4 is a sectional view taken along the line 4—4 in FIG. 3.
Figure 3:
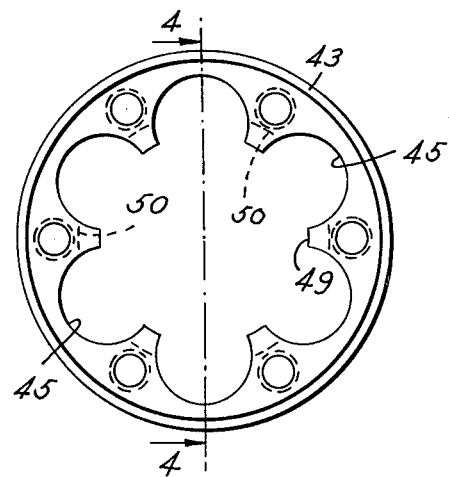
FIG. 3 is an elevational view of a part of a universal joint utilized in FIG. 5.

As shown in FIGS. 3-5, the portion of the outer race 43 having the grooves 45 therein is constructed such that the walls 49 between the grooves 45 have a central longitudinally extending straight portion 50 and arcuate end portions 51, 52. By this arrangement, the inner race 44 can move longitudinally of the outer race 43 within predetermined limits, that is, until the arcuate surfaces 53, 54 on the inner race 44 engage the surfaces 51, 52, respectively. This thus permits a predetermined longitudinal movement of the drive shaft 25 relative to the outer race 43 and, in turn, the differential of FIG. 1.

Additional longitudinal movement can be achieved through spline connection 40 and the movement of this spline connection 40 may also be limited by a shoulder 55 and retaining ring 41. Shoulder 55 can engage the inner race 36 to provide limited movement in one axial direction and retaining ring 41 can engage the inner race 36 to provide such a limited movement in the opposite axial direction.

In normal operation, vertical movement of wheel 21 will cause angular movement of shaft 25 and changes in the centerline distance between joints 23, 24. This normal movement is accommodated by the limited permissible stroke of joints 23 embodying the invention. Additional stroke to accommodate manufacturing tolerances of the vehicle or extreme movement of wheel 21 is provided by the spline connection 40. With shaft 25 able to move axially relative to both joints 23, 24, and in the absence of any auxiliary shaft positioning device, its position is sometimes indeterminate. For example, if wheel 21 were in an extreme position, causing maximum extension in center distance between joints 23, 24 and if the shaft were transmitting little or no torque, so that splined connection 40 could telescope freely, transient inertia or other forces might cause the shaft to move inwardly with respect to joint 23 and outwardly with respect to joint 24. If the stroke permitted in joint 23 were comparatively long, or if the length of engagement of splined connection 40 were comparatively short, and if some method such as retainer ring 41 were not provided, splined connection 40 might become disengaged. Conversely, if wheel 21 were in a position corresponding to minimum center distance length between joints 23 and 24 and if the shaft were transmitting little or no torque, transient forces might move the shaft outwardly with respect to joint 23 and inwardly with respect to joint 24 so that the end of shaft 25 might strike or rub against and damage or bind some other part of joint 24, were it not for shoulder 55.

This illustrates a significant point, namely, that if a driveshaft contains a telescoping universal joint and a telescoping splined connection in series, or two telescoping universal joints in series, and does not have other means for positioning the intermediate shaft between the telescoping connections, the stroke of each telescoping connection must have functional limiting means in each axial direction if the full stroke potential of both telescoping connections is to be utilized. In this discussion, stroke is considered to be limited in a functional manner if the limiting means are able to be engaged and to function without impairing or altering the operation of the telescoping device. If, at the end of the designed stroke, the telescoping device becomes disassembled or unstable, or if some part of the device comes into contact with another part in such a way as to limit stroke but also cause undesirable noise, vibration, heat, abrasion, etc., or to impair the action of the device, then the device does not have functional stroke limiting means.

A further analysis of shafts, as described above, containing two telescoping connections in series and having various combinations of functional stroke limiting means leads to the following conclusions:

if one of the telescoping connections has functional stroke limiting means in both axial directions and the other does not have functional limits in either direction, the usable stroke of the system is limited to the amount by which the stroke of the connection without functional limits exceeds the stroke of the connection with functional stroke limiting means;

if one telescoping connection has functional limiting means in only one axial direction and the other has functional limiting means in both directions, the usable stroke of the system is equal to the usable stroke of the connection with the unidirectional limiting means;

if both the telescoping connections have functional stroke limiting means in the inward axial direction only, or if both have such means in the outward direction only, the usable stroke of the system is equal to the shorter of the individual strokes of the two connections;

if one telescoping connection has functional stroke limiting means only in the inward direction and the other has such means only in the outward direction, the system will not function dependably;

if one telescoping connection has functional stroke limiting means in neither axial direction and the other has such means in one direction only, or in neither direction, the system will not function dependably.

Referring to FIG. 6, a drive shaft assembly 28 for use in the drive line shown in FIG. 2 comprises substantially identical joints 28a, 28b of the type shown in my aforementioned U.S. Pat. No. Re. 26,691. The output of transmission 27 drives outer race 56 of universal joint 28a which drives the inner race 57 through torque transmitting rollers 58 in the oppositely facing grooves 59, 60 in outer and inner races 56, 57, respectively. A boot 61 provides a seal for lubricant.

The inner race 57 includes a shaft 62 which is connected to a hollow drive shaft 63 that, in turn, drives a shaft 64 on inner race 65 of universal joint 28b. Inner race 65, in turn, drives outer race 66 through torque transmitting rollers 67 that are positioned in oppositely facing grooves 68, 69 in the inner and outer races 65, 66, respectively. A boot 70 provides a seal for lubricant.

In this form of the invention, the stroke limiting means to limit the axial outward movement of each inner race 57, 65 relative to its respective outer race 56, 66 comprises interengaging surfaces between the inner and outer races. Specifically, the walls 71, 72 which form the grooves 59, 69 in the outer races 56, 66 include a straight portion 73, 74, respectively, and a curved outer end portion 75, 76, respectively. The curved portions 75, 76 engage the inner races 57, 65, respectively, to limit the axial outward movement of the inner races 57, 65 relative to the outer races 56, 66.

In this form, the stroke limiting means for limiting the axial inward movement of the inner races 57, 65 comprises interengaging means between a cover 77, 78 on each joint 28a, 28b and the respective inner races. A contact member 79, 80 is rotatably or fixedly positioned in an axially extending opening 81, 82 in the respective inner races 57, 65. Each contact member 79, 80 includes a convex contact surface 83, 84 that engages a complementary concave surface 85, 86, respectively on the covers 77, 78.

FIGS. 7-10 show various other drive shafts capable of fulfilling the requirements shown schematically in FIGS. 1 and 2. FIG. 9 shows a type of shaft generally applicable to independently sprung wheel drives (FIG. 1) while FIGS. 7 and 10 show a type of shaft applicable to automobile propeller shafts (FIG. 2). However, these drive shafts are interchangable, within limits, in these applications and may also be used in a great variety of other applications on both mobile and stationary machinery.

FIGS. 11-16 show modified forms of universal joints and stroke limiting means which might be used in shafts such as in FIGS. 1, 2, 5, 6, 7, 9 and 10 or in other arrangements.

Referring to FIG. 7, the drive shaft assembly 90 which can be used in place of drive shaft assembly 28 in FIG. 2 includes an arrangement wherein the splined output shaft 91 from the transmission 27 drives outer race 92 of a universal joint 93 which has an inner race 94 and output shaft 95 which drives a hollow drive shaft 96 connected to the input shaft 97 on the inner race 98 of a universal joint 99 at the other end. Each of the universal joints 93, 99 is of the general construction disclosed in my aforementioned U.S. Pat. No. Re. 26,691.

Each joint 93, 99 includes oppositely facing grooves 100, 101 in the outer and inner race, respectively, and torque transmitting rollers 102 positioned in the grooves 100, 101. However, the universal joint 93 is modified in accordance with the invention so that the walls 103 include a straight portion 104 and arcuate or stop portions 105, 106 which are adapted to engage the inner race 94 so that the axial movement of the shaft 95 with respect to outer race 92 is limited to a predetermined stroke in each axial direction. Additional stroke can be achieved through the spline connection between shaft 91 and outer race 92. Because the spline connection is relatively long, it is not necessary to utilize the retainer ring 41 shown in FIG. 3. The universal joint 99 is of the non-telescoping type.

Referring to FIG. 9, a drive shaft assembly 110 is shown which can be utilized in place of the drive shaft assembly 22 of FIG. 1. The output gear 111 of differential 20 drives a shaft 112 through a spline connection 111a. Shaft 112 is connected to the outer race 113 of a universal joint 114. Universal joint 114 is of the general type such as shown in U.S. Pat. No. 2,910,845 and includes outer race 113 with three axially extending grooves 115 and an inner drive shaft 116 carrying three radially extending trunnion arms 117 with rollers 118 engaging the grooves 115 for transmitting torque. As presently described, the universal joint 114 is modified to incorporate the stroke limiting means of this invention. The drive shaft assembly 110 includes a conventional bell type Rzeppa universal joint 119.

The stroke limiting means for limiting axially outward movement of inner member 116 comprises a radially floating three-lobed floating ring 120 mounted on inner member 116 and urged against a flange 121 on member 116 by a spring 122. Ring 120 includes an arcuate surface 123 on each of its three lobes which is adapted to engage a cooperating convex surface 124 on the outer race 113. The stroke limiting means for limiting axially inward movement comprises a cover or end wall 125 on outer race 113 which is engaged by the convex end surface of member 116. A resilient pad 126 may be provided over cover 125.

Referring to FIG. 10, a modified form of propeller shaft assembly 130 is shown which can be used in place of the propeller shaft assembly 28 in FIG. 2 and comprises a hollow shaft 131 connected by a spline connection 132 to the transmission 27. Shaft 131 forms part of the universal joint 133, known as a double offset joint. Universal joint 133 has an outer driven member 134 connected to the shaft 131, an inner driven member 135 and balls 136 positioned in grooves 137 in the outer member 134 and grooves 138 in the inner member 135 for transmitting the torque therebetween. The construction further includes a ball cage 139 which positions the balls with respect to grooves 137, 138. The universal joint 133 includes the stroke limiting means of the invention, as presently described. In this shaft assembly, the other universal joint 140 is of the Cardan or Hooke type.

The stroke limiting means for limiting outward movement comprises an axially movable member 141 on outer race 134 which is urged axially inwardly by a spring 142 against cage 139. Cage 139 includes an arcuate surface 143 which is engaged by cooperating surface 144 and an O-ring 144a in a groove on member 141. The member 141 and race 134 include interengaging shoulders 145, 146 to limit the axially outwardly movement of member 141. Thus, this construction provides both stroke limiting means for limiting axially outward movement and also a seal for lubricant in the universal joint, thereby obviating the need for a boot. The means for limiting axially inward movement comprises complementary surfaces 147, 148 on cage 139 and outer member 134.

The universal joint 150 shown in FIG. 11 comprises an outer member 151, an inner member 152, balls 153 in grooves 154, 155 in the outer and inner members 151, 152 and a cage 156. The stroke limiting means for limiting axially outward movement comprises an axially movable member 157 on outer member 151 which is urged axially inwardly by a spring 158. The member includes a surface 159 engaging a complementary arcuate surface 160 on a member 161 fixed on member 152. As in the form shown in FIG. 10, interengaging shoulders on the outer member 151 and member 157 limit the relative axially outward movement. Alternatively, the interengaging shoulders on members 151, 157 may be omitted if spring 158 is made strong enough to limit the axial movement of member 157 relative to outer member 151.

The stroke limiting means for limiting axially inward movement comprises a stop 162 on outer member 151 which is adapted to be engaged by an arcuate surface 163 on inner member 152.

In the form of the invention shown in FIG. 12, the universal joint 165 is of the type shown in U.S. Pat. No. 3,106,077 and comprises an outer member 166, an inner member 167, an intermediate member 168 interposed in outer member 166 and axially slidable on inner member 167 and balls 169 positioned in grooves 170, 171 in the outer member 166 and inner member 167. In this form, the stroke limiting means for limiting axially outward movement comprises cooperating surfaces 172, 173 on the inner member 167 and outer member 166. The stroke limiting means for limiting axially inward movement comprises cooperating surfaces 174, 175 on the inner member 167 and outer member 166.

Figure 13:
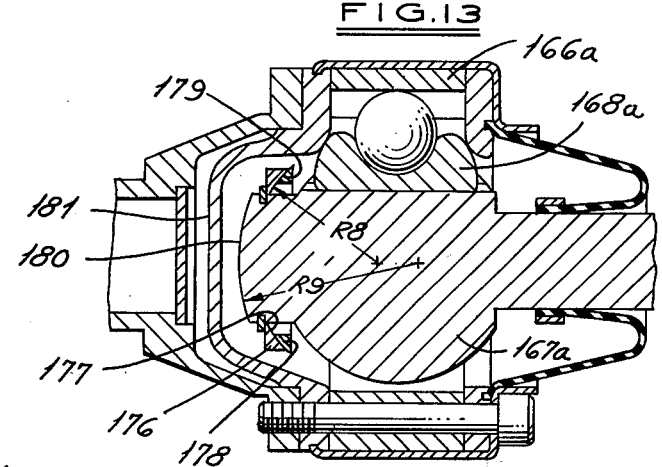
FIG. 13 is a longitudinal sectional view through a further modified telescoping universal joint.

The universal joint shown in FIG. 13 is of the general type shown in FIG. 12. The stroke limiting means for limiting axially outward movement comprises a pivotal annular element 176 on the inner member 167a which has a concave surface 177 that is engaged by a floating ring 178 having a complementary convex surface 179. The ring 178 is adapted to be engaged by intermediate members 168a. The stroke limiting means for limiting the axially inward movement comprises an arcuate surface 180 on inner member 167a which is adapted to engage a cover 181 on outer member 166a.

Figure 14:
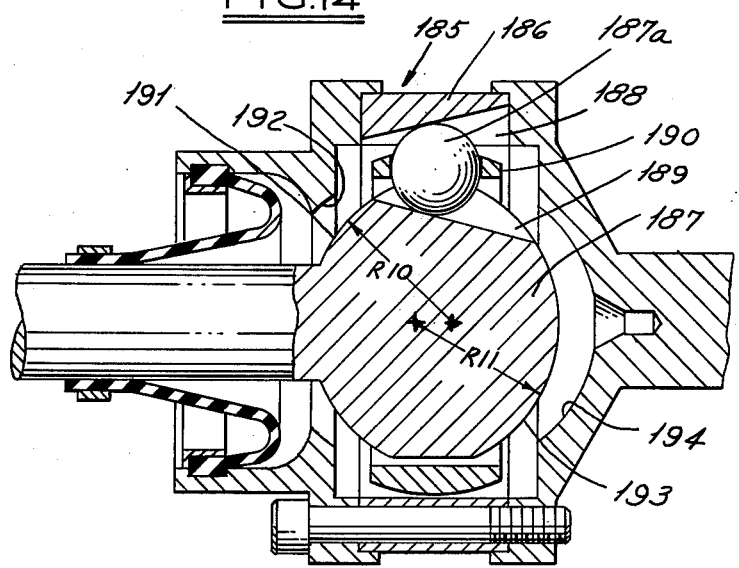
FIG. 14 is a longitudinal sectional view through a further modified telescoping universal joint.

The universal joint 185 shown in FIG. 14 comprises an outer member 186, an inner member 187, balls 187a in grooves 188, 189 and a cage 190. The stroke limiting means for limiting axially outward movement comprises cooperating surfaces 191, 192 on the inner member 187 and outer member 186. The stroke limiting means for limiting axially inward movement similarly comprises cooperating surfaces 193, 194 on the inner member 187 and outer member 186.

Figure 15:
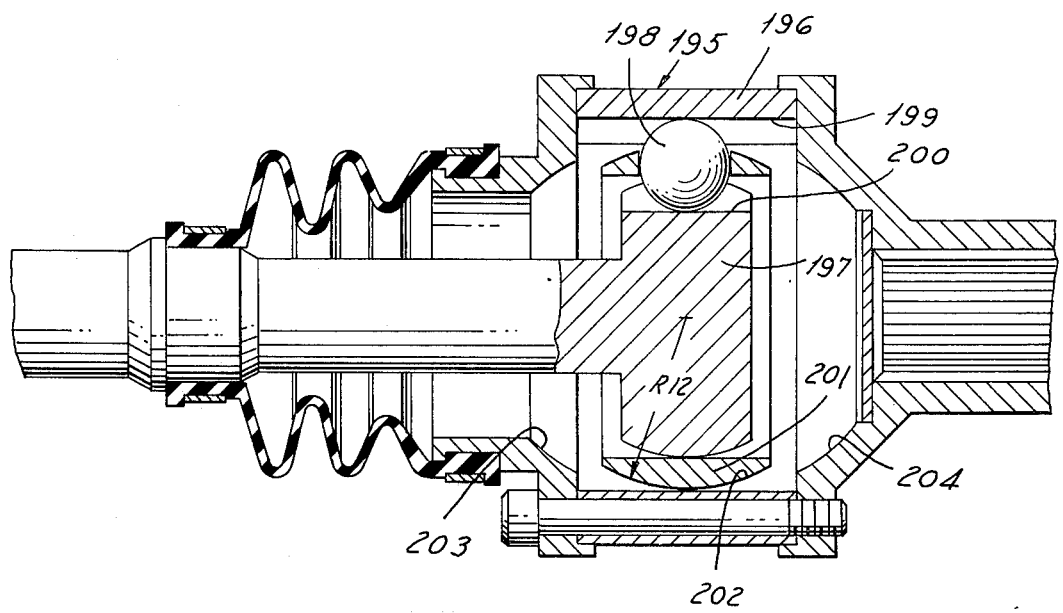
FIG. 15 is a longitudinal sectional view through a further modified telescoping universal joint.

The universal joint 195 shown in FIG. 15 comprises an outer member 196, an inner member 197, balls 198 in grooves 199, 200 and a cage 201. The stroke limiting means comprises a spherical surface 202 on the cage 201 which engages a surface 203 on the outer member 196 for limiting axially outward movement and a surface 204 on the outer member 196 for limiting axially inward movement.

Figure 16:
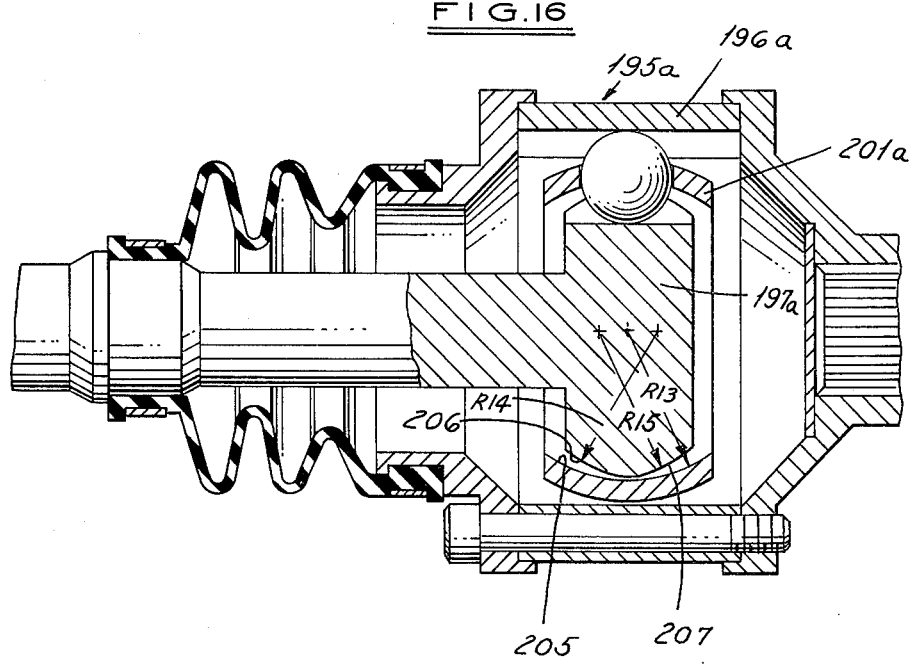
FIG. 16 is a longitudinal sectional view through a further modified telescoping universal joint.

The universal joint 195a shown in FIG. 16 is similar to the joint shown in FIG. 15. The stroke limiting means is provided between the inner spherical surface 205 of cage 201a and contacting spherical surfaces 206, 207 on the inner member 197a.

For convenience, the different types of universal joints embodying the invention can be grouped into classes according to certain mechanical characteristics.

One class might include joints as shown in FIGS. 5–8 with an outer housing or member, an inner member telescopically and pivotally received therein, axially extending grooves within the housing, axially extending grooves on the periphery of the inner member, and intermediate torque transmitting members positioned within the grooves, said torque transmitting bodies moving in general unison with the inner member as it moves axially with respect to the outer member. In this class of joint, the pivot center of the joint lies in the plane of the torque transmitting bodies and on the centerlines of the inner and outer members and moves axially in unison with the inner member. This class of joint has outward stroke limiting means comprising a spherical surface carried by the inner member and whose center lies on the centerline of the inner member and in the plane containing the centers of the intermediate torque transmitting bodies and which at the end of the desired outward stroke of the universal joint engages a cooperating surface carried by the outer housing near its end. This cooperating surface is a surface of revolution about the rotational centerline of the housing and may be of any shape, i.e. spherical, conical, toroidal, planar, etc., capable of engaging the spherical surface carried by the inner race without undue stress, noise or heat. Obviously, the spherical surface can be provided on an outer member, cooperating surface on inner member. Stroke limiting means for limiting axial movement in the inward direction comprises a second spherical surface similar to the first but carried by the inner race on its opposite end and at the end of the desired inward stroke engaging a second cooperating surface similar to the first and carried by the housing near its inner end.

A second class of telescoping universal joint illustrated by FIG. 9 has one driving/driven member with three axially extending grooves therein, a second driving/driven member carrying three radially extending trunnion arms, balls, rollers or sliding shoes mounted on said trunnions and engaging the grooves for transmitting torque between said driving/driven members while permitting both axial and angular movement therebetween.

An obscure characteristic of this class of joint is that when the joint is rotated with the driving/driven members angularly misaligned, the center of the trunnion or inner member orbits around the centerline of the grooved member at a frequency equal to three times joint rotational speed. Thus, driving and driven shafts centerlines do not constantly intersect and the pivot center of the joint is not determined by the intersection of these centerlines. This complicates the design of a functional stroke limiting means but an effective solution is possible as shown in FIG. 9.

The trunnion carrying member also carries stroke limiting means having a spherically shaped contacting surface 123, the center of the radius R1 of spherical curvature lying approximately in the plane of the trunnion arms and on the centerline of the grooved member. At the end of the desired stroke, the spherical surface engages a cooperating surface carried by the groove member. The cooperating surface is a surface of revolution about the rotational axis of the grooved member and may have spherical, conical, annular or other shape as described previously.

The limiting means 120, although carried by the trunnion bearing member 116, is not rigidly attached thereto but is free to move radially and is restrained against axial movement by shoulder 121. In theory, the working face of this shoulder 121 should be spherical in form with its center of curvature at the pivot center of the universal joint 119 at the other end of the trunnion bearing member, and the mating face of the limiting means 120 should be complementary in shape. However, because of the relatively small diameter and width of the shoulder face in comparison with the large distance between joint centers in most drive shafts, the spherical curvature of this surface is usually insignificant and a plane surface may frequently be used.

Means limiting inward movement should, in theory, be constructed in the same manner as above, but a practical approximation is possible in relatively long drive shafts or those operating at relatively small angles. This simplified means comprises a spherical surface with center of curvature on the centerline of the inner member 116 and in the trunnion plane, carried by the trunnion carrying member 116 which, at the end of the desired stroke, contacts a radially extending plane surface carried by the grooved member 113.

A variation of this second class comprises joints having only two trunnion arms on the second member, carrying balls, rollers or sliding blocks, and only two cooperating grooves in the first grooved member. These two-trunnion joints can be made so that the trunnion member does not orbit but maintains its center on the centerline of the grooved member. Stroke limiting means for these joints may be made as for the three trunnion joints except that the stroke limiting means carried by the trunnioned member need not be free to move radially with respect thereto but may be mounted fixedly thereto or made integral therewith. Thus, this variation of the second class of joints is seen to have the same requirements for stroke limiting means as the first described class, and this variation may properly be considered a member of the first class.

A third class of telescoping universal joint illustrated by FIGS. 10 and 11 has an outer driving/driven member comprising a housing with axially extending grooves therein, an inner driving/driven member telescopically and pivotally received within said outer member, balls positioned within receiving means of said inner member and in the grooves in the outer member for transmitting torque therebetween, and a ball cage operably engaging the balls to assist in maintaining them in the desired positions, the cage and balls moving substantially unitarily with the inner member as it moves axially with respect to the outer member. The cage pivotally engages the inner member about a center which is offset axially in one direction from the ball plane while it engages the outer member pivotally about a center which is similarly offset from the ball plane but in the opposite axial direction.

In this class of joint, the joint pivot center lies on the ball plane and on the center lines of the inner member and outer member and moves in unison with the inner member as the inner member moves axially with respect to the outer member. Also, the cage moves axially substantially in unison with the inner member, thus either the cage or the inner member may carry spherically shaped stroke limiting means engaging suitable cooperating surfaces carried by the outer member. As shown in FIG. 10, the cage includes spherical surfaces 147, 143, generated by radii R2, R3, each of which has its origin on the pivot center of cage 139 with respect to the outer member 134, which engage complementary surface 148, 144 on the outer member.

FIG. 11 shows spherical inward and outward stroke limiting surfaces 163, 160, respectively, with centers of curvature lying on the joint pivot center and carried by the inner member. Surfaces 163, 160 engage cooperating surfaces 162, 159 carried by outer member 151. The radii R4, R5 of curvatures of surfaces 163, 160 have a common center.

FIGS. 10 and 11 illustrate clearly another aspect of this invention. That is, the same techniques used to define the shapes and locations of functional stroke limiting devices can also be applied to design mechanical seals for telescoping universal joints, for both a stroke limiting means and a mechanical seal can incorporate a spherical surface, with center of curvature properly located, which is carried by one part of a universal joint and which engages a cooperating surface carried by another part. The only significant difference is that a mechanical seal requires that one of the surfaces be slidably carried by one of the parts and be urged axially into contact with the other surface, while for stroke limiting purposes, the surfaces may be either slidably mounted or fixed axially with respect to the parts. As shown in FIG. 10, the cooperating surface may incorporate an O-ring or similar resilient contact element to provide a better seal against the spherical surface. However, as shown in FIG. 11, simple metal-to-metal wiping surfaces, without the resilient element, may provide a satisfactory seal for many applications.

These same principles could apply to sealing the other joints shown and described.

A fourth class of telescoping universal joint is pictured in FIGS. 12 and 13 and is of the general type shown in U.S. Pat. No. 3,106,077 comprising an outer driving/driven member in the form of a housing with receiving means therein for torque transmitting balls, an inner member telescopically and pivotally received in said housing and having axially extending grooves thereon for receiving torque transmitting balls, torque transmitting balls positioned between the outer and inner member and means for positioning the balls in the desired plane, said ball plane moving substantially unitarily with said housing as the members move axially with respect to one another.

In joints of this class, the pivot center lies in the ball plane and on the centerlines of the inner and outer members and is maintained in a fixed position with respect to the housing. Stroke limiting means may comprise surfaces between the inner member and the housing as shown in FIG. 12. Alternatively, the stroke limiting means may comprise surfaces between the inner member and the positioning means (FIG. 13).

In FIG. 12, the centers of the radii R6, R7 of spherical surfaces 172, 174 do not lie in the central transverse plane of the inner race but lie on those points on the inner race center line which will lie in the ball plane at the instant of engagement of each respective spherical surface with its cooperating surface.

In the stroke limiting means in FIG. 13, the radii of curvature R8, R9 are similarly positioned as in the joint shown in FIG. 12.

FIGS. 14–16 show a fifth class of telescoping universal joint characterized by a first driving/driven member having axially extending grooves, a second driving/driven member telescopically and pivotally engaging said first member and having axially extending grooves in paired relationship with the grooves in said first member, said paired grooves intersecting in the radial direction (FIG. 14) or the circumferential direction (FIGS. 15, 16), each pair having a mirror image relationship in a manner known in the art, driver balls interposed between the first and second members and received by said paired grooves, and a positioning means operably engaging the drive balls to assist in maintaining them in the desired plane, the plane of said driver balls not moving unitarily with either the first or the second member as the same move axially with respect to each other but said ball plane maintaining an axial position relatively intermediate between the two members.

In this class of joint, the pivot center lies on the centerlines of the first and second members but is not fixed either with respect to the first member or to the second member but is fixed with respect to the ball plane. This permits stroke limiting means to exist either between the positioning means and the first member, or between the positioning means and the second member, or between the first member and the second member.

In FIG. 14, inward and outward stroke limiting means are shown between the second member 187 and the first member 186. Spherical surface 191 has its center of curvature R10 on the center line of the second member 187 at the point which lies in the ball plane at the instant of contact of the stroke limiting means. That is, the center of curvature of the stroke limiting spherical surface lies on the pivot center of the joint when it engages its cooperating surface 192. Similarly, spherical surface 193 has its center of curvature R11 positioned so that it lies on the pivot center of the joint when it engages cooperating surface 194.

In FIG. 15, the center of curvature of radius R12 lies in the ball plane on the pivot center of the joint.

In FIG. 16, the joint uses a spherical inner surface 205 on the cage with the center of its generating radius R13 in the ball plane and on the pivot center of the joint. The cooperating surfaces 206, 207 are shown as spherical outer portions of the inner member, and the center of curvature of radii R14, R15 of each lying in the ball plane at the movement of its engagement by the limiting means on the cage. However, other shapes are possible, for example, a portion of a toroid could be used.

In each of the forms of universal joint, it should be understood that an inversion can be made of the surfaces between the cooperating parts which produce a stroke limiting means, i.e., with each pair of cooperating surfaces, either may be made spherical in shape, the other of a suitable cooperating shape.

I claim:

1. A telescoping universal joint comprising
a driving member,
a driven member,
torque transmitting means between the driving and driven members,
and means for limiting relative axial inward and outward movement between said members and for maintaining said members in fixed axial relationship while limiting said axial movement between said members as the joint rotates at any angular alignment of the members.

2. A universal joint according to claim 1 wherein said means for limiting axial movement between said members in each axial direction comprises a pair of cooperating surfaces.

3. A universal joint according to claim 2 wherein one surface of each pair of said cooperating surfaces is spherical in shape.

4. A universal joint according to claim 3 wherein the center of curvature of said spherical surface lies on the pivot center of the universal joint during the time of its engagement with its cooperating surface.

5. A universal joint according to claim 4 wherein as one member moves axially relative to the other, the pivot center of the joint maintains a relatively fixed relationship with respect to one member and moves axially with respect to the other.

6. A universal joint according to claim 4 wherein as one member moves axially relative to the other, the pivot center of the joint moves axially relative to both members and maintains an axial position relatively intermediate the two members.

7. A universal joint according to claim 1 wherein the torque transmitting members define a plane,
said limiting means in each axial direction comprising a pair of cooperating surfaces,
one surface of each pair of surfaces being spherical in shape and having its center of curvature substantially in the plane of the torque transmitting members at the time of its engagement with its cooperating surface.

8. A universal joint according to claim 7 wherein the centerlines of the driving and driven members maintain an intersecting relationship during only a portion of the operation of the universal joint with said members misaligned.

9. A telescoping universal joint comprising
a driving member,
a driven member,
torque transmitting means between the driving and driven members,
and means for limiting relative axial outward movement between said members and for maintaining said members in fixed axial relationship while limiting said axial movement between said members as the joint rotates at any angular alignment of the members.

10. The combination set forth in claim 9 including means for enclosing and sealing one end of said joint comprising a pair of cooperating surfaces, one of which is mounted for axial movement relative to the member which carries it and is urged axially into contact with its cooperating surface.

11. A universal joint according to claim 10 wherein one of said cooperating surfaces is permitted limited radial movement relative to the member which carries it.

12. The combination set forth in claim 9 wherein said telescoping joint comprises a part of a drive line including a second universal joint and telescoping torque transmitting connection in series with said joints.

13. A drive line as described in claim 12 wherein said telescoping torque transmitting connection also includes axial stroke limiting means in each direction.

14. The combination set forth in claim 9 wherein said telescoping joint comprises a part of a drive line including a second telescoping joint including
a driving member,
a driven member, torque transmitting means between the driving and driven members, and means for limiting relative axial outward movement between said members, said means for limiting relative axial outward movement of said second joint comprising a pair of cooperating surfaces, said surfaces coming into contact to limit the stroke in each direction, said surfaces being in continuous contact as the universal joint rotates during the stroke limiting action, one of said surfaces being associated with one of said driving member, driven member or torque transmitting means, and the other of said surfaces being associated with another of said driving member, driven member or said torque transmitting means.

15. A drive line as described in claim 14 wherein the input member of the drive line is a transmission and the output member a driving axle of a vehicle.

16. A drive line as described in claim 14 wherein the input member to the drive line is a differential and the output member a driving wheel of a vehicle.

17. A telescoping universal joint comprising
a driving member,
a driven member,
torque transmitting means between the driving and driven members,
and means for enclosing and sealing the space around said members by means of slidably or pivotally engaged surfaces.

18. A universal joint according to claim 17 wherein said enclosing and sealing means includes a pair of cooperating surfaces, one of which is permitted axial movement relative to the member which carries it and is urged axially into contact with its cooperating surface.

19. A universal joint according to claim 18 wherein one of said cooperating surfaces is spherical in shape.

20. A universal joint according to claim 19 wherein one of said cooperating surfaces is permitted limited radial movement relative to the member which carries it.

21. A universal joint according to claim 19 wherein the center of curvature of the spherical surface is located at the pivot center of the joint.

22. A telescoping universal joint comprising
an outer driving or driven member,
an inner driving or driven member received within said outer member,
axially extending grooves in at least one of said outer member and said inner member,
torque transmitting means between said members and engaging said grooves,
and means for limiting the relative movement in each axial direction between said members and for maintaining said members in fixed axial relationship while limiting said axial movement between said members as the joint rotates at any angular alignment of the members.

23. A universal joint according to claim 22 wherein the means for limiting movement in each of the axial directions comprises a pair of cooperating surfaces, one surface of each pair of surfaces being spherical in shape.

24. A universal joint according to claim 23 wherein the construction is such that as the members move axially relative to one another, the pivot center of the joint maintains a relatively fixed position with respect to the inner member and moves axially with respect to the outer member, the center of curvature of each spherical limiting surface lying on the pivot center of the joint during the time of its engagement with its cooperating surface.

25. A universal joint according to claim 24 wherein a said spherical surface is carried by the inner member and its cooperating surface is carried by the outer member.

26. A universal joint according to claim 24 wherein a said spherical surface is carried by the outer member and its cooperating surface is carried by the inner member.

27. A universal joint according to claim 23 wherein the construction is such that as the members move axially relative to one another, the pivot center of the joint maintains a relatively fixed position with respect to the outer member and moves axially with respect to the inner member, the center of curvature of each spherical limiting surface lying on the pivot center of the joint during the time of its engagement with its cooperating surface.

28. A universal joint according to claim 27 wherein a said spherical surface is carried by the inner member and its cooperating surface is carried by the outer member.

29. A universal joint according to claim 27 wherein a said spherical surface is carried by the outer member, its cooperating surface is carried by the inner member.

30. A universal joint according to claim 23 wherein the construction is such that during operation with the members misaligned, the centerlines of said members do not maintain an intersecting relationship, one of said cooperating surfaces having limited radial movement relative to the member which carries it.

31. A universal joint according to claim 30 wherein a said spherical surface is carried by the inner member and its cooperating surface is carried by the outer member.

32. A universal joint according to claim 30 wherein a said spherical surface is carried by the outer member and its cooperating surface is carried by the inner member.

33. A universal joint according to claim 23 wherein one of said cooperating surfaces is permitted axial movement with respect to the member on which it is carried and is urged axially into contact with its paired cooperating surface.

34. A universal joint according to claim 33 wherein one surface of said paired cooperating surfaces is permitted limited radial movement relative to the member on which it is carried.

35. A telescoping universal joint comprising
an outer driving or driven member,
an inner driving or driven member received within said outer member,
axially extending grooves in at least one of said outer member and said inner member,
torque transmitting means between said members and engaging said grooves,
and means for limiting the relative axial movement in the outward direction between said members and for maintaining said members in fixed axial relationship while limiting said axial movement between said members as the joint rotates at any angular alignment of the members.

36. A telescoping universal joint comprising
an outer driving or driven member, an inner driving or driven member received within said outer member,
axially extending grooves in at least one of said outer member and said inner member,
torque transmitting means between said members and engaging said grooves,
and means for sealing the space between said member by means of slidably or pivotally engaged surfaces.

37. A universal joint according to claim 36 wherein said sealing means includes a pair of cooperating surfaces, one of which is permitted axial movement relative to the member which carries it and is urged axially into contact with its cooperating surface.

38. A universal joint according to claim 37 wherein one of said cooperating surfaces is spherical in shape.

39. A universal joint according to claim 37 wherein one of said cooperating surfaces is permitted limited radial movement relative to the member which carries it.

40. A universal joint according to claim 37 wherein the center of curvature of the spherical surface coincides with the pivot center of the joint.

41. A telescoping universal joint comprising
an outer driving or driven member,
an inner driving or driven member received within said outer member,
axially extending grooves in at least one of said outer member and said inner member,
torque transmitting means in said grooves,
positioning means to assist in positioning said torque transmitting means relative to said members,
and means for limiting the relative movement between said members in each axial direction and for maintaining said members in fixed axial relationship while limiting said axial movement between said members as the joint rotates at any angular alignment of the members.

42. A universal joint according to claim 41 wherein the means for limiting movement in each of the axial directions comprises a pair of cooperating surfaces, one surface of each pair being spherical in shape.

43. A universal joint according to claim 42 wherein as the members move axially relative to one another, the pivot center of the joint maintains a relatively fixed position with respect to the inner member and moves axially with respect to the outer member.

44. A universal joint according to claim 43 wherein a said spherical surface is carried by the inner member, its cooperating surface is carried by the outer member.

45. A universal joint according to claim 43 wherein a said spherical surface is carried by the outer member, its cooperating surface is carried by the inner member.

46. A universal joint according to claim 43 wherein a said spherical surface is carried by the positioning means, its cooperating surface is carried by the outer member.

47. A universal joint according to claim 44 wherein a said spherical surface is carried by the outer member, its cooperating surface is carried by the positioning means.

48. A universal joint according to claim 42 wherein as the members move axially relative to one another, the pivot center of the joint maintains a relatively fixed position with respect to the outer member and moves axially relative to the inner member.

49. A universal joint according to claim 48 wherein a said spherical surface is carried by the inner member and its cooperating surface is carried by the outer member.

50. A universal joint according to claim 48 wherein a said spherical surface is carried by the outer member, its cooperating surface is carried by the inner member.

51. A universal joint according to claim 48 wherein a said spherical surface is associated with the inner member, its cooperating surface being associated with the positioning means.

52. A universal joint according to claim 48 wherein a said spherical surface is associated with the positioning means and its cooperating surface is associated with the inner member.

53. A universal joint according to claim 42 wherein as the inner and outer members move axially relative to one another, the pivot center of the joint moves axially with respect to both members and maintains an axial position intermediate the two members.

54. A universal joint according to claim 53 wherein a said spherical surface is carried by the inner member, its cooperating surface is carried by the outer member.

55. A universal joint according to claim 53 wherein a said spherical surface is carried by the outer member, its cooperating surface is carried by the inner member.

56. A universal joint according to claim 53 wherein a said spherical surface is carried by the inner member, its cooperating surface is carried by the positioning means.

57. A universal joint according to claim 53 wherein a said spherical surface is carried by the positioning means, its cooperating surface is carried by the inner member.

58. A universal joint according to claim 53 wherein a said spherical surface is carried by the positioning means, its cooperating surface is carried by the outer member.

59. A universal joint according to claim 53 wherein a said spherical surface is carried by the outer member, its cooperating surface is carried by the positioning means.

60. A universal joint according to claim 42 wherein one of said cooperating surfaces is permitted axial movement with respect to the member which carries it and is urged axially into contact with its paired cooperating surface.

61. A universal joint according to claim 60 wherein one surface of said paired cooperating surfaces is permitted limited radial movement relative to the member which carried it.

62. A drive line incorporating two telescoping universal joints in series,
each joint having stroke limiting means in each axial direction, so as to permit greater axial movement between the input and output members of the drive line than would be possible with only one telescoping joint.

63. A drive line as described in claim 62 wherein the input member of the drive line is a transmission and the output member a driving axle of a vehicle.

64. A drive line as described in claim 62 wherein the input member to the drive line is a differential and the output member a driving wheel of a vehicle.

65. A drive line incorporating one or more telescoping universal joints,
each joint having stroke limiting means in each axial direction,
and another telescoping torque transmitting connection in series with said joints so as to permit greater axial movement between the input and output members of the drive line than would be possible with the telescoping universal joints alone.

66. A drive line as described in claim 65 wherein said telescoping torque transmitting connection also includes axial stroke limiting means in each direction.

67. A drive line as described in claim 65 wherein the input member of the drive line is a transmission and the output member a driving axle of a vehicle.

68. A drive line as described in claim 65 wherein the input member to the drive line is a differential and the output member a driving wheel of a vehicle.

* * * * *